Patented Feb. 4, 1941

2,230,470

UNITED STATES PATENT OFFICE 2,230,470

POLYMERIZING FATTY OILS

Alexander Schwarcman, Buffalo, N. Y., assignor to Spencer Kellogg and Sons, Inc., Buffalo, N. Y., a corporation of New York No Drawing. Application February 8, 1939, Serial No. 255,347

9 Claims. (Cl. 260—407)

This invention or discovery relates to polymerizing fatty oils; and it comprises an improvement in methods of polymerizing or bodying fatty oils, such as linseed oil, by heating to temperatures such as 500° to 600° F., wherein polymerization is accelerated by the presence of a minute amount of a polycyclic aromatic compound carrying at least two phenolic groups and at least one carboxyl group, the said compound acting as a catalyst; and it comprises as a new article of commerce a fatty oil adapted for quick bodying when heated, and containing a small amount of a polycyclic aromatic compound carrying phenolic and carboxyl groups; all as more fully hereinafter set forth and as claimed.

Fatty oils, and especially drying oils and semi-drying oils, are often thickened or "bodied" to improve their utility for certain purposes, and this bodying is often accomplished by heating to a temperature of the order of 500° to 600° F., for a sufficient period. The resulting internal rearrangement or polymerization increases the viscosity and density of the oil. The degree to which bodying is carried depends on the purpose for which the oil is to be used, and the result depends on the time and temperature of heating used as well as in the oil. For example, in making commercial "stand oil," "lithographer's varnish," etc., from linseed oil, the temperature applied is generally of the order of 550° to 600° F. and the time of heating may be as much as 8 hours or more. The time may be shortened where less extensive bodying is required in treating linseed oil, perilla oil, soy bean oil, fish oil, etc., prior to their use in making varnishes, enamels, paints, printing inks, linoleum, etc. In a general way, in producing a given body the semi-drying oils, such as soy oil, require longer heating than linseed and perilla oil; both of which contain glycerides of linolenic acid.

The heating of fatty oils at high temperatures such as those which are used in polymerization and bodying always tends to darken the oil and to increase the acidity to a greater or less extent. For example, in converting neutral linseed oil to stand oil by polymerization a substantial acidity may develop; an acid number of 18 or 20, for example. It is therefore desirable to provide a catalyst making it possible to effect the desired amount of bodying in a shorter time, thereby lessening darkening or discoloration and the development of acidity. And it is necessary that the polymerization catalyst shall not change the usual desirable characteristics of the fatty oil under treatment.

The requirements of a satisfactory catalyst are quite severe, and meeting these severe requirements is an object achieved in the present invention. The catalyst must have enough activity at bodying temperatures to substantially shorten the time of heating, but it must generally have no other effect. It must be inert to the oil at ordinary temperatures and in storage. It must also be a substance which can be used in such small amounts that its presence in the oil has no substantial detrimental effect on the usual properties of the oil. After the oil has been bodied, the catalyst generally cannot be removed by any simple and economical procedure, and it must therefore be of such a nature that, if retained in the oil, it will not darken pigments and will not keep on reacting in the finished product to cause "livering" or darkening of paint, or development of bloom.

In my prior and copending application, Serial No. 246,761, now Patent No. 2,207,686, I have disclosed that oxidation products of certain hydrocarbons of the phenanthrene series are suitable catalysts for bodying oils. For the present purposes these oxidation products may be considered as ketones, such as phenanthrene-ketone or phenanthrene-quinone, and the corresponding oxidation products of retene and picene, for example. Other ketones and quinones have also been suggested as catalysts for the polymerization of fatty oils; and amino compounds, such as benzidine, in the patent literature. Anthraquinone has been tried.

I have discovered, however, that polycyclic aromatic compounds carrying two phenolic groups are much more potent catalysts of polymerization than the ketones, quinones and amino compounds. For example, a typical quinone or diketone type of catalyst must generally be employed in amounts of the order of 0.15 to 0.3 per cent (on the drying oil) to obtain a certain effect, but I have found that the corresponding di-phenol compound produces the same effect under the same conditions when employed in quantities of the order of 0.03 per cent on the oil. Generally speaking, my new type catalysts are from 5 to 10 times as active as the catalysts previously known. This makes possible a highly desirable reduction in the amount of catalyst employed.

The activity of these catalysts in my process is apparently due to the presence of a plurality of phenol groups carried by a polycyclic structure. Especially good results are obtained with polycyclic compounds carrying two phenol groups.

Compounds of this type resemble the leuco compounds known in the dyeing industry, in that they can theoretically be obtained by reduction of more highly oxidized compounds, and in that they are highly sensitive to oxidation. They are not stable when exposed to the air. I have found, however, that when these active di-phenolic bodies are so synthesized that they also carry a carboxyl group, the sensitivity to oxidation disappears. Catalysts containing two phenol groups and a carboxyl group are stable at all temperatures to which they are exposed in storage and in use in the present invention; and are effective at polymerizing temperatures when present in extremely minute quantities, as previously noted. My invention may therefore be defined as the acceleration of the polymerizing or bodying of fatty oils by the addition thereto, prior to polymerization, of a catalyst which is a polycyclic organic compound carrying two phenol groups and a carboxyl group. All such compounds are within the purview of my invention.

Compounds of the type which I find most satisfactory as catalysts are not well-known in the literature, but may be readily synthesized. A particularly useful compound of this type may be designated diphenol-carboxyl-anthracene; it apparently has a tricyclic structure like that of anthracene but carries two phenolic groups on the middle ring and a carboxyl group on one of the end rings. The position of the carboxyl group is not greatly material. Such a substance may be prepared by reacting phthalic anhydride with toluene in the presence of aluminum chloride, which acts as a condensing catalyst. This yields toluyl-benzoic acid, which is treated with sulfuric acid to close the ring, forming methyl anthraquinone. The methyl group is now oxidized to a carboxyl group by treating it with potassium permanganate solution or other suitable oxidizing agent. Carboxyl anthraquinone is thus obtained. This product is then reduced with sodium bisulfite to form the diphenol carboxyl anthracene. The structural formula of this compound is believed to be the following:

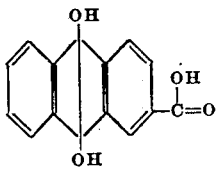

or

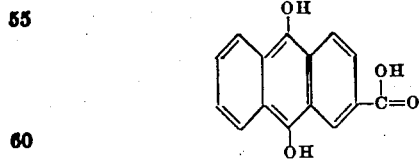

The activity of this compound is approximately six times as great as that of the methyl anthraquinone to which it is related. It also has the advantage over quinones such as methyl anthraquinone that it has a much higher boiling point and hence will remain in the oil during bodying whereas these quinones begin to evaporate at bodying temperatures around 600° F. Similar improvements in activity are obtained by converting other polycyclic ketones and quinones into the carboxylated diphenol compounds. To produce such compounds, it is essential that there be a carboxyl group carried by the compound which is reduced to the diphenol form, and this may be provided by oxidation of a methyl group in a side chain. The starting materials for the production of my catalysts are therefore polycyclic compounds carrying carboxyl groups or side chains convertible to carboxyl, containing methyl groups, for example. It is immaterial how these groups are introduced, and methyl anthraquinone or carboxyl anthraquinone from other sources than the synthesis described are examples of suitable starting materials. The corresponding derivatives of phenanthrene-like compounds are also suitable.

After the conversion, my catalysts carrying at least two phenol groups and a carboxyl group have a bodying effect comparable to that of the most closely related compounds heretofore proposed if they be used in about a fifth the amount or less. This is highly desirable. The less of any foreign body which is added to a commercial fatty oil, the better.

These diphenol carboxyl compounds are not very quickly soluble in linseed oil or other fatty oils, and it is therefore most convenient to employ them by preparing large master batches. For example, in treating 100 barrels of oil, the necessary amount of such a catalyst as described may be heated with about 10 per cent of the oil to about 400° with agitation for an hour or two. Most of the catalyst dissolves during this period, and any undissolved residue may be removed by filtration. The master batch is then added to the main body of the oil, advantageously with some heating, and the oil is then ready for marketing, or for heating to effect quickened polymerization under the influence of the catalyst. The oil containing the catalyst may be thickened by the maker prior to sending into the market, or may be sold as such, thereby allowing the purchaser in either case to effect the degree of polymerization desired.

The most desirable embodiment of my invention from a commercial standpoint is a drying oil such as linseed oil or soybean oil containing about 0.01 to 0.05 per cent of the carboxylated diphenolic polycyclic compound. An oil containing this amount of my catalyst is ready for bodying to any desired extent at any subsequent time. It is stable in storage. Whatever the degree of bodying desired, it can be obtained with the oil containing the catalyst in about half the time required for heating the same oil to obtain the same bodying without the catalyst. Sometimes the saving in time is greater. For example, a linseed oil which normally requires heating for 5½ to 6 hours at a temperature of about 580° F. to reach a consistency of 6Z on the Gardner Holdt scale, will reach the same consistency upon heating to the same temperature for about 3 hours in the presence of 0.03 per cent of diphenol carboxyl anthracene. It is noteworthy that this improvement is effected with no accompanying objectionable results. Larger amounts of my catalyst such as 0.1 to 0.3 per cent on the oil may also be employed without detriment to the product, but they are generally unnecessary.

One of the desirable features of the employment of these stabilized diphenol compounds as catalysts is that these catalysts do not cause discoloration of the oil, and have no injurious effect on the finished oil. Even sensitive pigments, such as white lead, are not darkened by oils polymerized in accordance with this invention. The bodied oils produced with the aid of my catalyst are substantially identical chemically and physically with those obtained by the usual methods of bodying without a catalyst, except that the acidity developed during bodying is lower, and the color of the final product is generally better, when my catalysts are employed.

In making the catalyst by the detailed procedure described, there is usually more or less accumulation of side products. In oxidizing a methyl group with permanganate, for example, it is difficult to remove manganese compounds. Such removal is not necessary, however. While the products of the synthesis described may be purified, it generally is not necessary. In the extremely small quantities of my catalysts which are required, the presence of impurities is immaterial. No noteworthy color or acidity is developed by the catalyst; nor is there any injury to the oil in storage, before or after polymerization.

What I claim is:

1. The method of polymerizing or bodying fatty oils, which comprises heating a fatty oil capable of polymerization to a temperature of 500 to 600° F. in the presence of a small amount of a polycyclic aromatic compound carrying at least two phenol groups and a carboxyl group, and adapted to catalyze polymerization of the oil.

2. The process of claim 1, wherein the fatty oil is linseed oil.

3. The process of claim 1, wherein the said aromatic compound comprises diphenol carboxyl anthracene.

4. As a new composition of matter, a fatty oil containing a minor amount of a polycyclic aromatic compound carrying at least two phenol groups and a carboxyl group, the amount being sufficient to accelerate bodying at polymerizing temperatures.

5. The composition of claim 4, wherein the fatty oil is linseed oil.

6. The composition of claim 4, wherein the said aromatic compound comprises diphenol carboxyl anthracene.

7. The composition of claim 4, wherein the said aromatic compound is present in an amount less than 0.05 per cent by weight on the oil, and is adapted to catalyze polymerization of the oil.

8. The process of claim 1, wherein the fatty oil is soy bean oil.

9. The composition of claim 4, wherein the fatty oil is soy bean oil.

A. SCHWARCMAN.